United States Patent
Taubler et al.

(10) Patent No.: US 10,415,410 B2
(45) Date of Patent: Sep. 17, 2019

(54) AXIAL-RADIAL COOLING SLOTS ON INNER AIR SEAL

(71) Applicant: United Technologies Corporation, Farmington, CT (US)

(72) Inventors: James W Taubler, Stuart, FL (US); Peter E Gunderson, West Hartford, CT (US); Sunny Anant Patel, Newington, CT (US); Andrew P Boursy, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 404 days.

(21) Appl. No.: 15/287,284

(22) Filed: Oct. 6, 2016

(65) Prior Publication Data

US 2018/0100404 A1   Apr. 12, 2018

(51) Int. Cl.
*F04F 5/16* (2006.01)
*F04F 5/46* (2006.01)
(Continued)

(52) U.S. Cl.
CPC .............. *F01D 11/001* (2013.01); *F01D 5/06* (2013.01); *F01D 5/081* (2013.01); *F01D 11/005* (2013.01);
(Continued)

(58) Field of Classification Search
CPC ........ F01D 11/001; F01D 11/005; F01D 5/06; F01D 5/081; F01D 25/12; F02C 3/04; F16J 15/162; F16J 15/447; F05B 2260/20; F05D 2220/32; F05D 2220/323; F05D 2230/10; F05D 2230/13; F05D 2230/31;
(Continued)

(56) References Cited

U.S. PATENT DOCUMENTS

| 4,526,508 A | * | 7/1985 | Antonellis | .............. | F01D 5/066 |
| | | | | | 415/173.7 |
| 6,422,815 B1 | * | 7/2002 | Marler | .................... | F01D 11/02 |
| | | | | | 29/401.1 |

(Continued)

FOREIGN PATENT DOCUMENTS

| FR | 2973433 A1 | 10/2012 |
| WO | 2005052321 A1 | 6/2005 |
| WO | 2015177429 A1 | 11/2015 |

OTHER PUBLICATIONS

Machine Translation of FR 2973433 A1 [retrieved on Jan. 26, 2019]. Retrieved from: Espacenet.*

(Continued)

*Primary Examiner* — Nathaniel E Wiehe
*Assistant Examiner* — David Whittaker
(74) *Attorney, Agent, or Firm* — Snell & Wilmer, L.L.P.

(57) ABSTRACT

An air seal may comprise an annular ring defined by at least a proximal surface, a distal surface, an aft side and a forward side. A channel may be disposed in the forward side of the air seal and/or the aft side of the air seal and may extend between the proximal surface and the distal surface. An additional channel extending from at least one of the forward side or the aft side may be disposed in the distal surface. The channel and the additional channel may be circumferentially in line. The channels may define a flow path for direction cooling air from a proximal side of the air seal to a distal side of the air seal.

18 Claims, 11 Drawing Sheets

(51) Int. Cl.
| | |
|---|---|
| *F04D 17/16* | (2006.01) |
| *F04D 25/06* | (2006.01) |
| *F04D 25/08* | (2006.01) |
| *F04D 25/16* | (2006.01) |
| *F04D 29/42* | (2006.01) |
| *F04D 29/66* | (2006.01) |
| *F01D 11/00* | (2006.01) |
| *F01D 5/08* | (2006.01) |
| *F01D 5/06* | (2006.01) |
| *F01D 25/12* | (2006.01) |
| *F02C 3/04* | (2006.01) |
| *F16J 15/16* | (2006.01) |
| *F16J 15/447* | (2006.01) |

(52) U.S. Cl.
CPC ............... *F01D 25/12* (2013.01); *F02C 3/04* (2013.01); *F16J 15/162* (2013.01); *F16J 15/447* (2013.01); *F05B 2260/20* (2013.01); *F05D 2220/32* (2013.01); *F05D 2220/323* (2013.01); *F05D 2230/10* (2013.01); *F05D 2230/13* (2013.01); *F05D 2230/31* (2013.01); *F05D 2240/12* (2013.01); *F05D 2240/35* (2013.01); *F05D 2240/55* (2013.01); *F05D 2240/57* (2013.01); *F05D 2300/17* (2013.01); *Y02T 50/676* (2013.01)

(58) Field of Classification Search
CPC ............ F05D 2240/12; F05D 2240/35; F05D 2240/55; F05D 2240/57
USPC ......................................................... 416/116
See application file for complete search history.

(56) References Cited

U.S. PATENT DOCUMENTS

| | | | |
|---|---|---|---|
| 8,186,938 B2 * | 5/2012 | Young | F01D 11/001 415/113 |
| 8,500,394 B2 * | 8/2013 | Major | F01D 17/162 415/160 |
| 2012/0171022 A1 | 7/2012 | Hafner | |

OTHER PUBLICATIONS

Machine Translation of WO 2005052321 A1 [retrieved on Jan. 26, 2019]. Retrieved from: Espacenet.*
EP Search Report dated Mar. 7, 2018 EP App No. 17193358.3.

* cited by examiner

AXIAL-RADIAL COOLING SLOTS ON INNER AIR SEAL

FIELD

This disclosure relates generally to gas turbine engines, and more particularly to air seal arrangements for turbine engines.

BACKGROUND

Gas turbine engines are known, and typically include a fan delivering air into a compressor, and also outwardly of the compressor as bypass air. The air is compressed in the compressor and delivered downstream into a combustion section where it is mixed with fuel and ignited. Products of this combustion pass downstream to a turbine and over turbine rotors, driving the turbine rotors to rotate. The turbine rotors in turn rotate the compressors and fan.

The turbine may include multiple rotatable turbine blade arrays separated by multiple stationary vane arrays. The turbine blades are coupled to a rotor disk assembly which is configured to rotate about an engine axis. Typically, an air seal is provided between an aft rotor disk and a forward rotor disk and radially inward from a stationary vane. The air seal may experience thermal loading during operation of the gas turbine engine.

SUMMARY

An air seal for a gas turbine engine comprising an annular ring defined by at least a proximal surface, a distal surface, an aft side and a forward side, a radial channel disposed in the air seal, the radial channel disposed in at least one of the forward side or the aft side, the radial channel extending between the proximal surface and the distal surface, and an axial channel disposed in the distal surface, the axial channel extending from at least one of the forward side or the aft side and circumferentially in line with the radial channel.

In various embodiments, the radial channel may be disposed on the aft side and the axial channel extends from the aft side. The radial channel may be disposed on the forward side and the axial channel extends from the forward side. The radial channel and the axial channel may be configured to direct a cooling air from a proximal side of the air seal to a distal side of the air seal for cooling the air seal. The air seal may be configured to receive the cooling air from an aperture disposed in a rotor disk leg, the rotor disk leg being located radially inward from the air seal. The air seal may be configured to be coupled between a forward rotor disk and an aft rotor disk. The air seal may comprise knife edges extending from the distal surface, the knife edges configured to interface with a proximal surface of a vane platform. The air seal may comprise a nickel-based alloy. A cross-section area of the radial channel may be greater than a cross-section area of the axial channel.

A gas turbine engine may comprise a compressor section, a combustor section, a turbine section, an aft blade disk, a forward blade disk, and an air seal coupled between the aft blade disk and the forward blade disk. The air seal may comprise an annular ring defined by at least a proximal surface, a distal surface, an aft side and a forward side, a radial channel disposed in at least one of the forward side or the aft side and extending between the proximal surface and the distal surface, and an axial channel disposed in the distal surface and extending from at least one of the forward side or the aft side and circumferentially in line with the radial channel.

In various embodiments, the radial channel may be disposed on the aft side and the axial channel extends from the aft side. The radial channel may be disposed on the forward side and the axial channel extends from the forward side. The radial channel and the axial channel may be configured to direct a cooling air from a proximal side of the air seal to a distal side of the air seal for cooling the air seal. The air seal may be configured to receive the cooling air from an aperture disposed in a rotor disk leg, the rotor disk leg being located radially inward from the air seal. The air seal may be configured to be coupled between a forward rotor disk and an aft rotor disk. The air seal may comprise knife edges extending from the distal surface, the knife edges configured to interface with a proximal surface of a vane platform. The air seal comprises a nickel-based alloy.

A method of manufacturing an air seal for a gas turbine engine may comprise forming a radial channel in at least one of a forward side or an aft side of the air seal, the radial channel extending between a proximal surface and a distal surface, forming an axial channel in a distal surface of the air seal, the axial channel extending from at least one of the forward side or the aft side and circumferentially in line with the radial channel.

In various embodiments, the forming the radial channel may be performed by milling the at least one of the forward side or the aft side of the air seal. The forming the radial channel and the forming the axial channel may provide the radial channel having a cross-section area which is greater than a cross-section area of the axial channel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
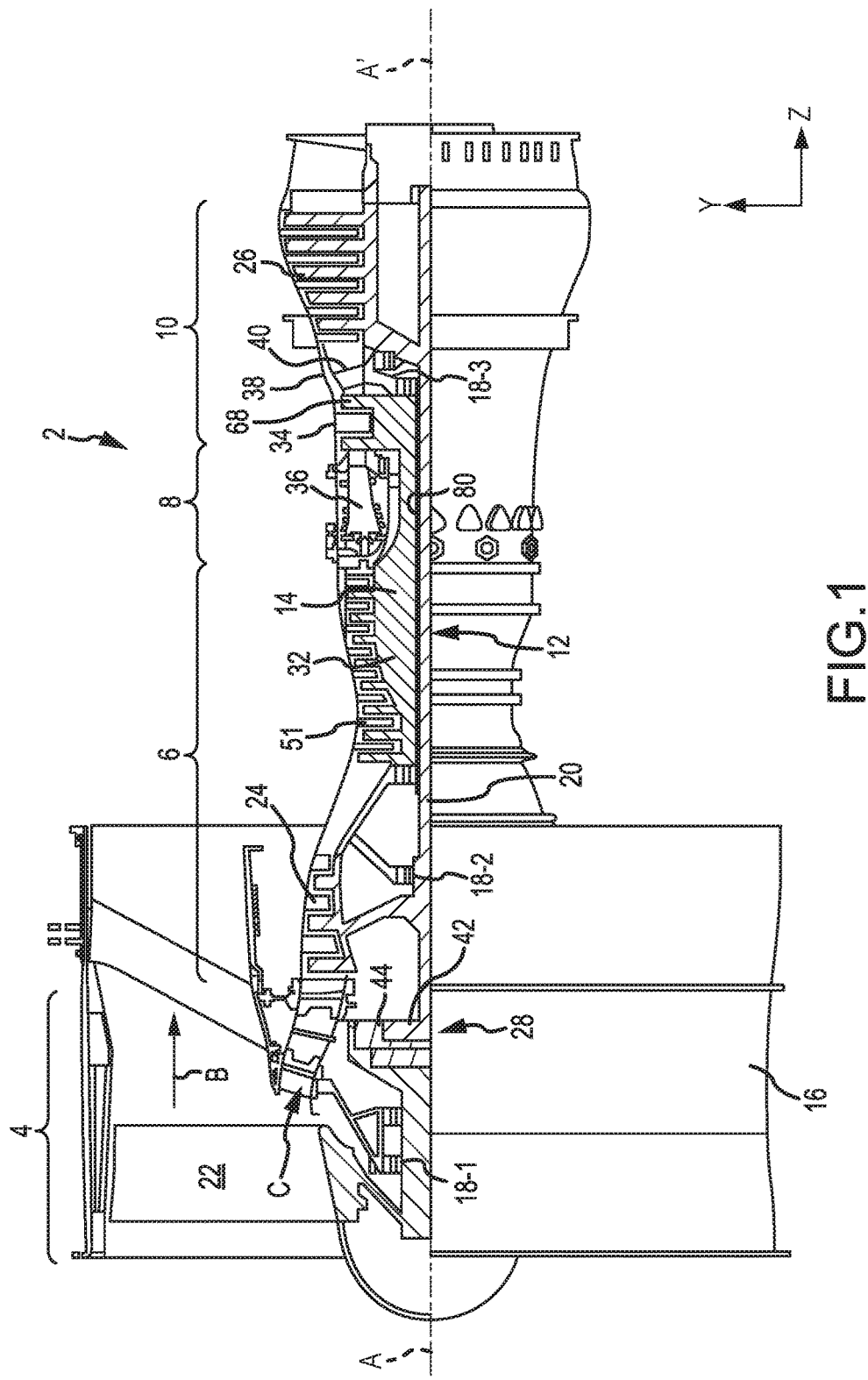
FIG. 1 illustrates a side cutaway view of a turbine engine, in accordance with various embodiments.

With reference to FIG. 1, an exemplary gas turbine engine 2 is provided, in accordance with various embodiments. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis A-A' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 and a stator vane 51. Rotor blades 68 and stator vanes 51 may be arranged circumferentially about the engine central longitudinal axis A-A'.

Figure 2:
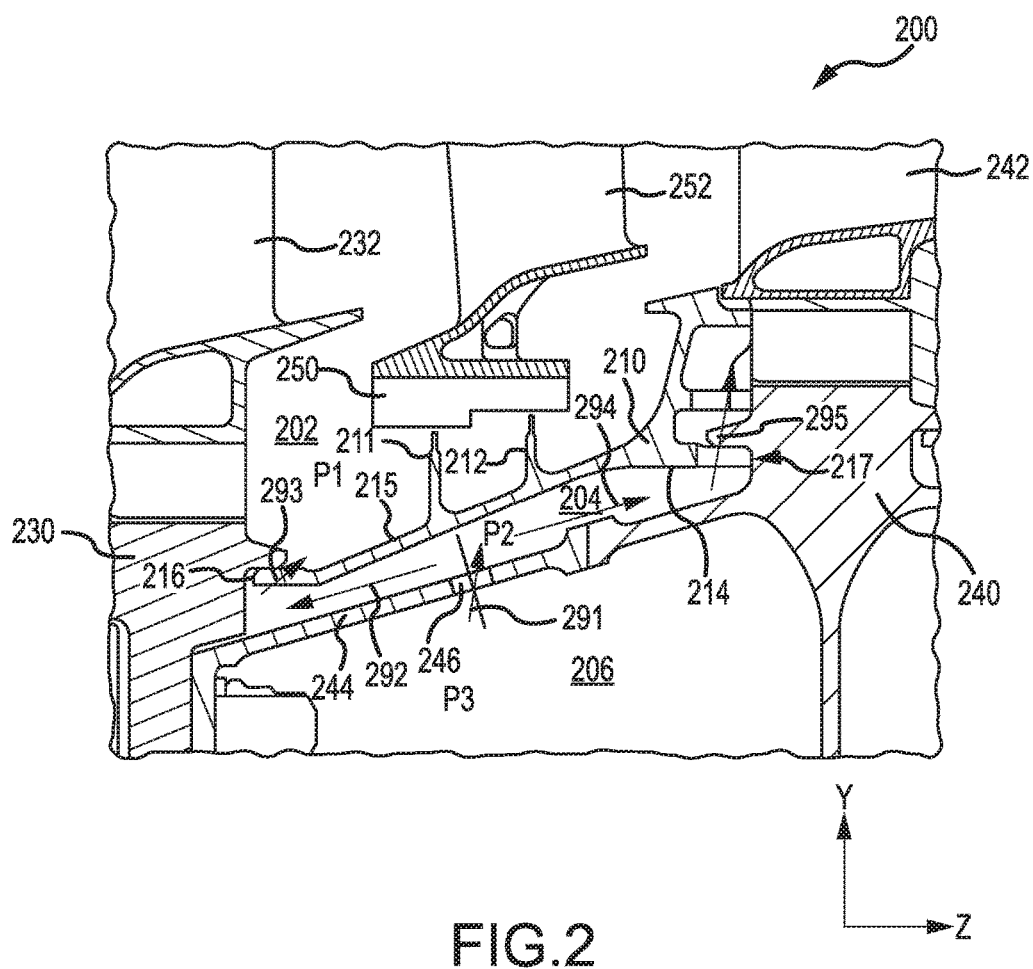
FIG. 2 illustrates a cross-section view of a turbine section of a gas turbine engine, in accordance with various embodiments.

With reference to FIG. 2, a cross-section view of turbine section 200 is illustrated, in accordance with various embodiments. Yz-axes are provided for ease of illustration. Turbine section 200 may include air seal 210, forward rotor disk 230, aft rotor disk 240, and vane platform 250. A stator vane 252 may extend from vane platform 250. Stator vane 252 may be stationary. Air seal 210 may be coupled between forward rotor disk 230 and aft rotor disk 240. Air seal 210 may comprise knife edge 211 and knife edge 212. Knife edge 211 and knife edge 212 may extend radially outward from air seal 210. Knife edge 211 may extend towards vane platform 250. Knife edge 212 may extend towards vane platform 250. Air seal 210 may be defined by a distal surface 215, a proximal surface 214, a forward side 216, and an aft side 217.

Aft rotor disk 240 may include a leg 244 extending from aft rotor disk 240 towards forward rotor disk 230. Leg 244 may be coupled to forward rotor disk 230. Leg 244 may comprise an aperture 246. A first cavity 202 may be located radially outward from air seal 210. First cavity 202 may be partially defined by distal surface 215. First cavity 202 may comprise a first pressure P1 during operation of turbine section 200. For example, first cavity 202 may comprise a first pressure P1 during takeoff and cruise conditions. A second cavity 204 may be located radially inward from air seal 210. Second cavity 204 may be at least partially defined by proximal surface 214 and leg 244. Second cavity 204 may comprise a second pressure P2 during operation of turbine section 200. A third cavity 206 may be located radially inward from leg 244. Third cavity 206 may comprise a third pressure P3 during operation of turbine section 200. Aperture 246 may be configured and sized such that pressure P2 is tends to be greater than pressure P1. In this regard, cooling air may enter second cavity 204 from third cavity 206 via aperture 246, as illustrated by arrow 291. Cooling air may be directed forward, as illustrated by arrow 292, and/or may be directed aft, as illustrated by arrow 294. Cooling air directed in the forward direction may enter channels, as will be discussed in greater detail herein, formed into forward side 216 of air seal 210 and directed into first cavity 202, as illustrated by arrow 293. Cooling air directed in the aft direction may enter channels, as will be discussed in greater detail herein, formed into aft side 217 of air seal 210 and directed radially outwards, as illustrated by arrow 295.

With respect to FIG. 3A through FIG. 5B, elements with like element numbering, as depicted in FIG. 2, are intended to be the same and will not necessarily be repeated for the sake of clarity.

Figure 3B:
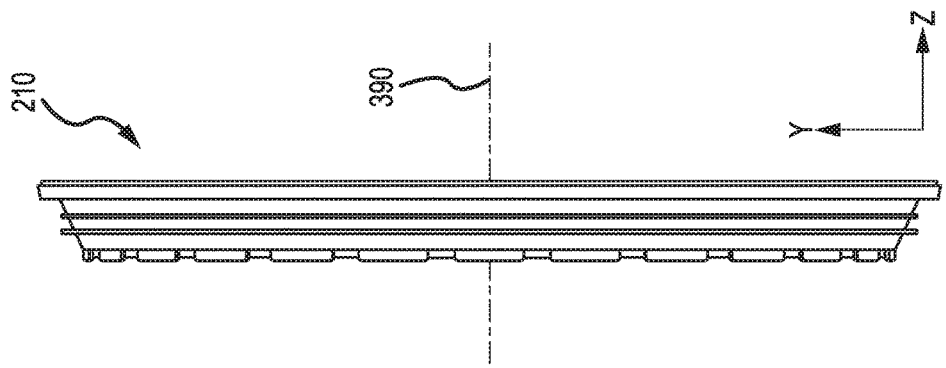
FIG. 3B illustrates a radial view of an air seal, in accordance with various embodiments.
Figure 3A:
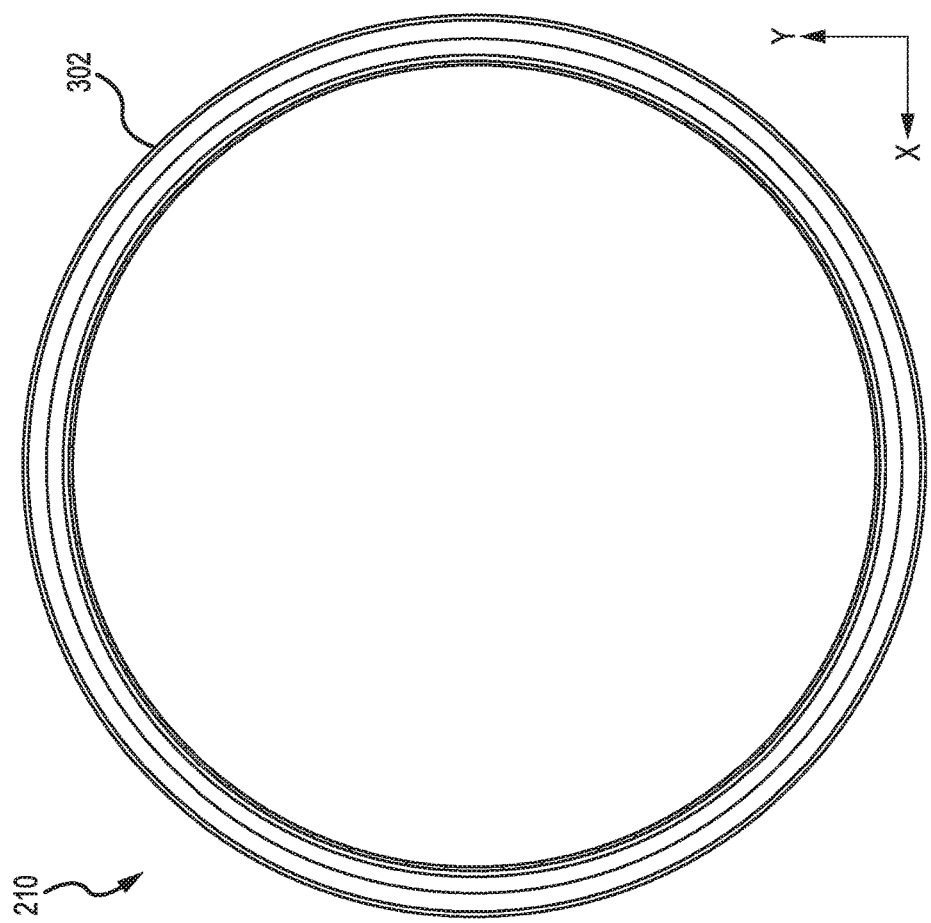
FIG. 3A illustrates an axial view of an air seal, in accordance with various embodiments.

With combined reference to FIG. 3A and FIG. 3B, an axial view and a radial view of air seal 210, respectively, are illustrated, in accordance with various embodiments. Xy-axes and yz-axes, respectively, are provided for ease of illustration. Air seal 210 may comprise an annular ring 302. Air seal 210 may comprise a centerline axis 390. Centerline axis 390 may be substantially concentric with engine central longitudinal axis A-A' (see FIG. 1) in response to air seal 210 being in an installed position.

Figure 3C:
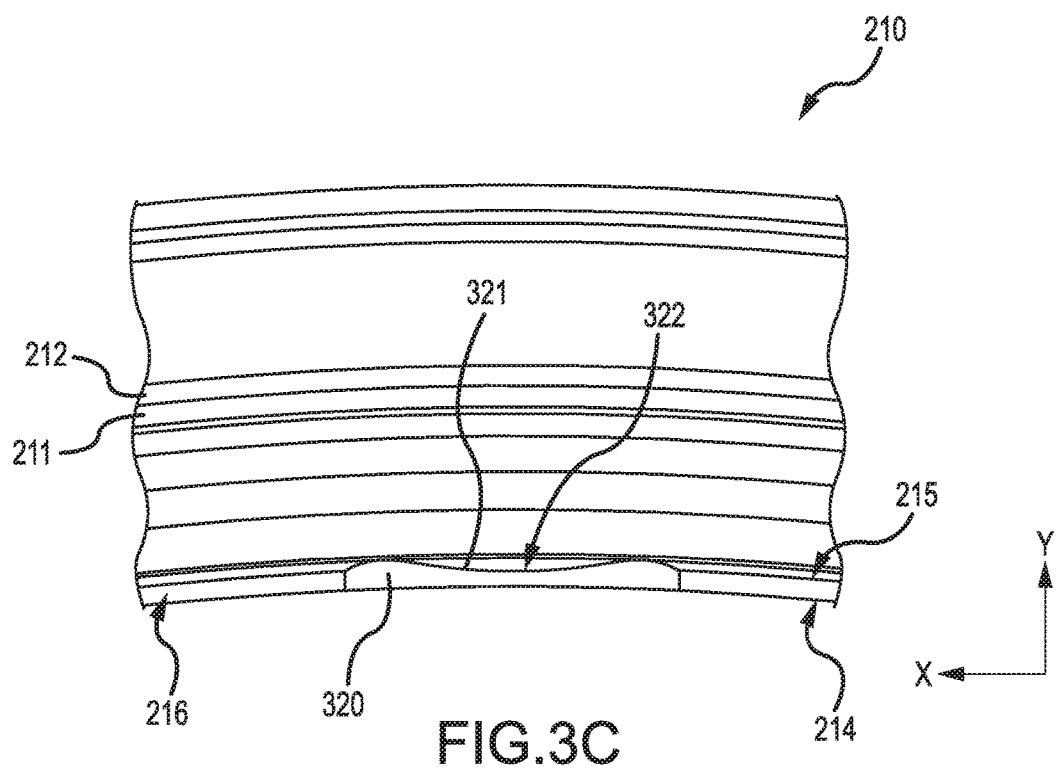
FIG. 3C illustrates a close-up axial view of channels formed in the air seal, in accordance with various embodiments.

With reference to FIG. 3C, an axial view of the forward side 216 air seal 210 is illustrated, in accordance with various embodiments. Xy-axes are provided for ease of illustration. A radial channel 320 may be disposed in forward side 216 of air seal 210. Radial channel 320 may extend between proximal surface 214 and distal surface 215. Radial channel 320 may extend in a radial direction (y-direction). An axial channel 322 may be disposed in distal surface 215 of air seal 210. Axial channel 322 may extend from forward side 216 of air seal 210. Axial channel 322 may extend in an axial direction (z-direction). Axial channel 322 may be circumferentially in line with radial channel 320 as illustrated in FIG. 3C. In this regard, radial channel 320 and axial channel 322 may interface at edge 321.

Figure 3D:
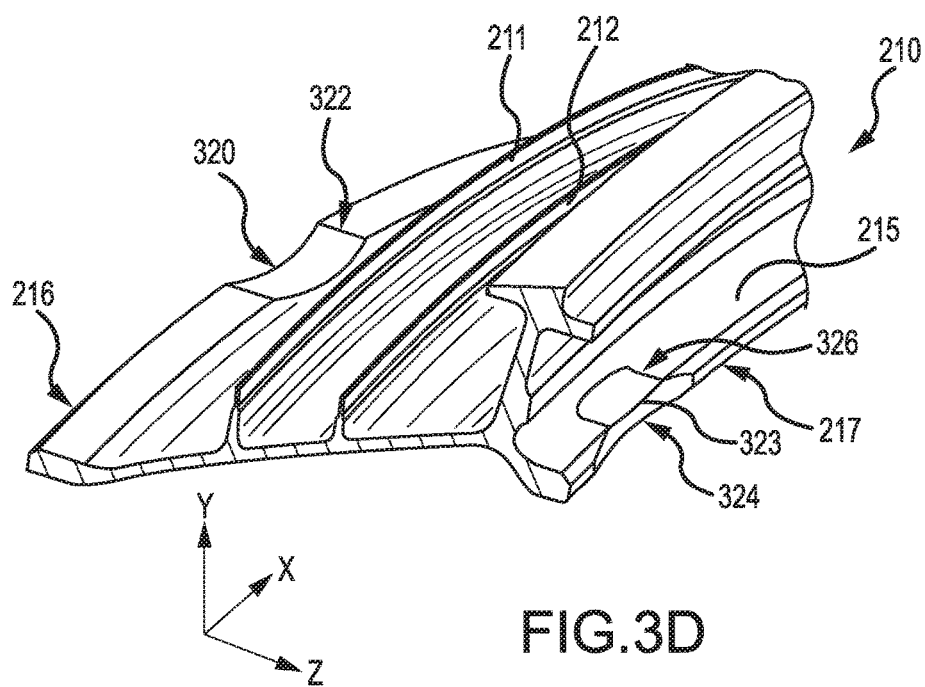
FIG. 3D illustrates a perspective, cross-section view of the air seal having channels formed into the air seal, in accordance with various embodiments.

With reference to FIG. 3D, a perspective view of air seal 210 is illustrated, in accordance with various embodiments. Xyz-axes are provided for ease of illustration. A radial channel 324 may be disposed in aft side 217 of air seal 210. Radial channel 324 may extend between proximal surface 214 (see FIG. 2) and distal surface 215. Radial channel 324 may extend in a radial direction (y-direction). An axial channel 326 may be disposed in distal surface 215 of air seal 210. Axial channel 326 may extend from aft side 217 of air seal 210. Axial channel 326 may extend in an axial direction (z-direction). Axial channel 326 may be circumferentially in line with radial channel 324 as illustrated in FIG. 3D. In this regard, radial channel 324 and axial channel 326 may interface at edge 323.

Figure 3E:
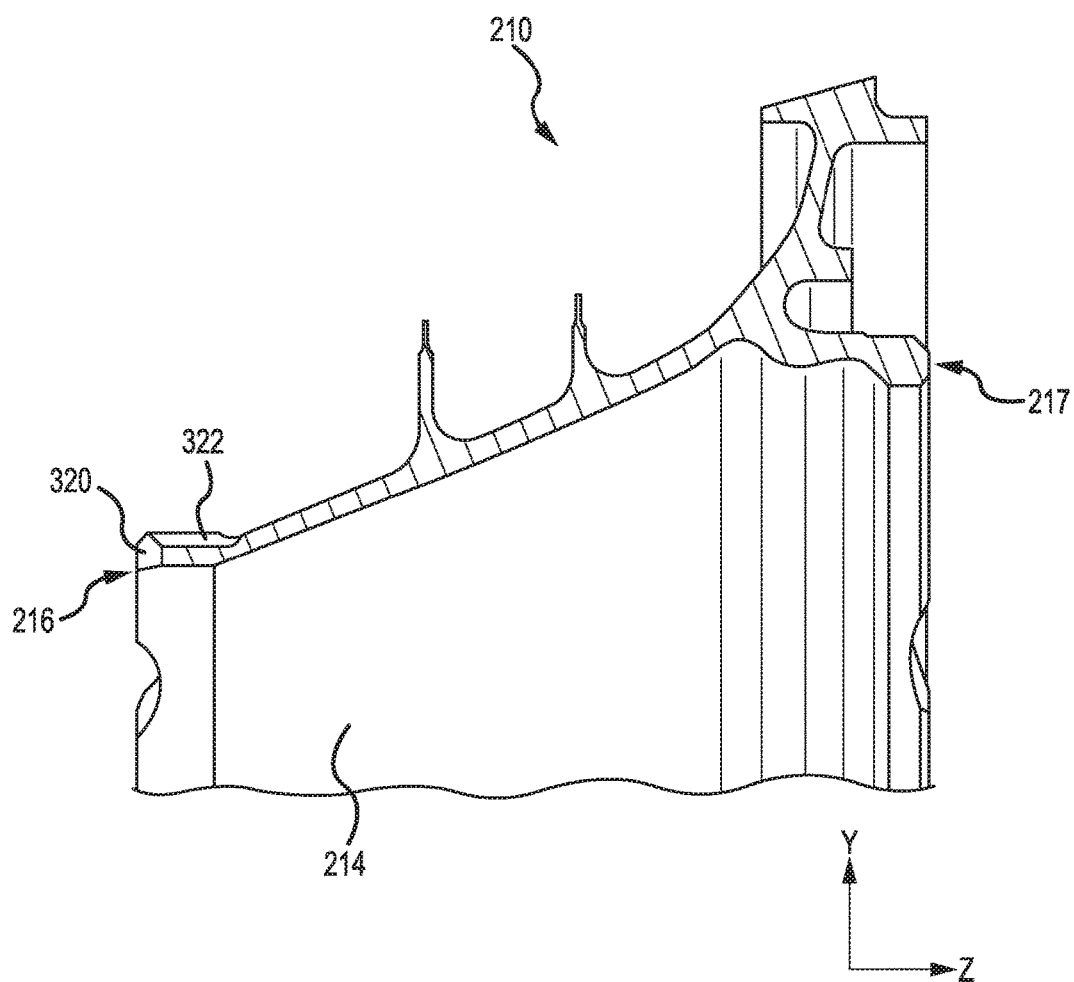
FIG. 3E illustrates an isolated cross-section view of the air seal, the cross section intersecting channels disposed in the forward side of the air seal, in accordance with various embodiments.

With reference to FIG. 3E, an isolated cross-section view, with the cross-section intersecting radial channel 320 and axial channel 322, of air seal 210 is illustrated, in accordance with various embodiments.

Figure 3F:
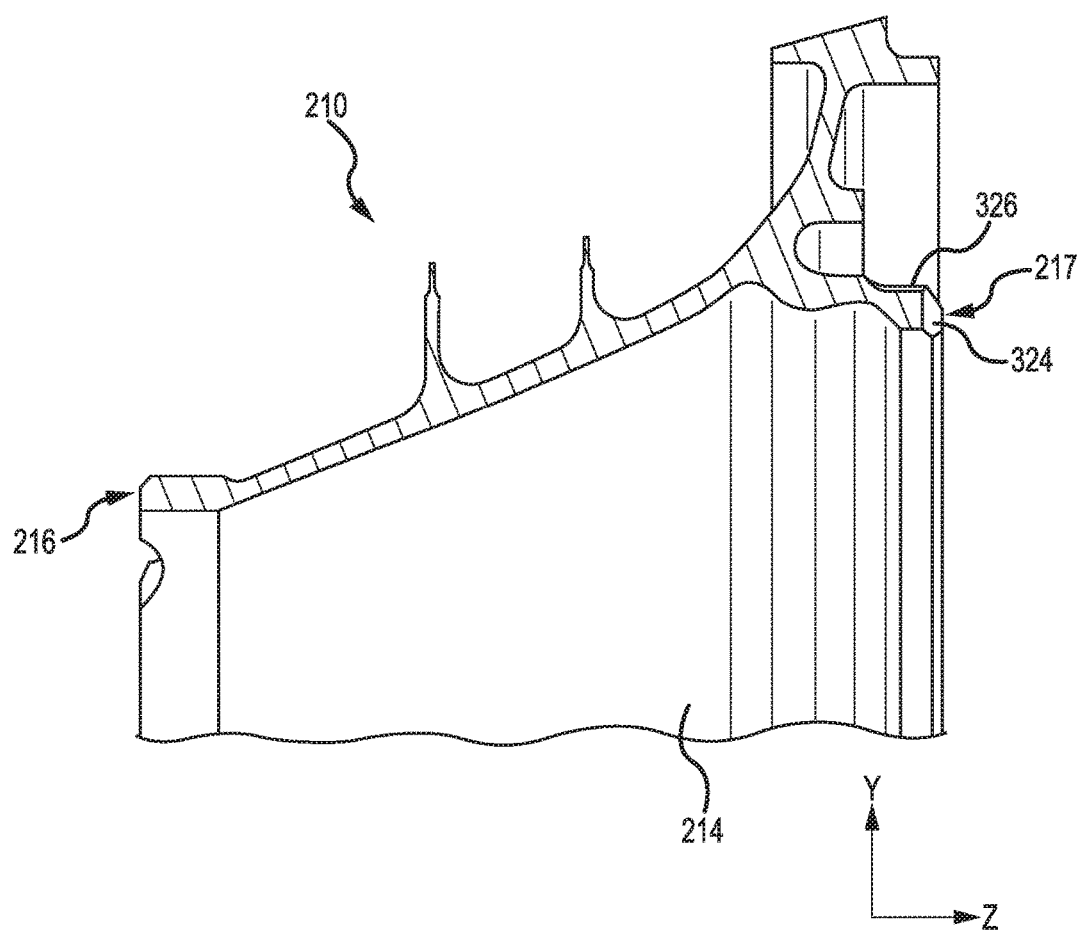
FIG. 3F illustrates an isolated cross-section view of the air seal, the cross section intersecting channels disposed in the aft side of the air seal, in accordance with various embodiments.

With reference to FIG. 3F, an isolated cross-section, view with the cross-section intersecting radial channel 324 and axial channel 326, of air seal 210 is illustrated, in accordance with various embodiments.

With combined reference to FIG. 3E and FIG. 3F, radial channel 320 and axial channel 322 may be circumferentially offset from radial channel 324 and axial channel 326. However, it is contemplated herein that radial channel 320 and axial channel 322 may be circumferentially in line with radial channel 324 and axial channel 326. Further, a plurality of channels 320 and channels 322 may be circumferentially spaced about centerline axis 390 (see FIG. 3B) in forward side 216. Still further, a plurality of channels 324 and channels 326 may be circumferentially spaced about centerline axis 390 (see FIG. 3B) in aft side 217.

Figure 4A:
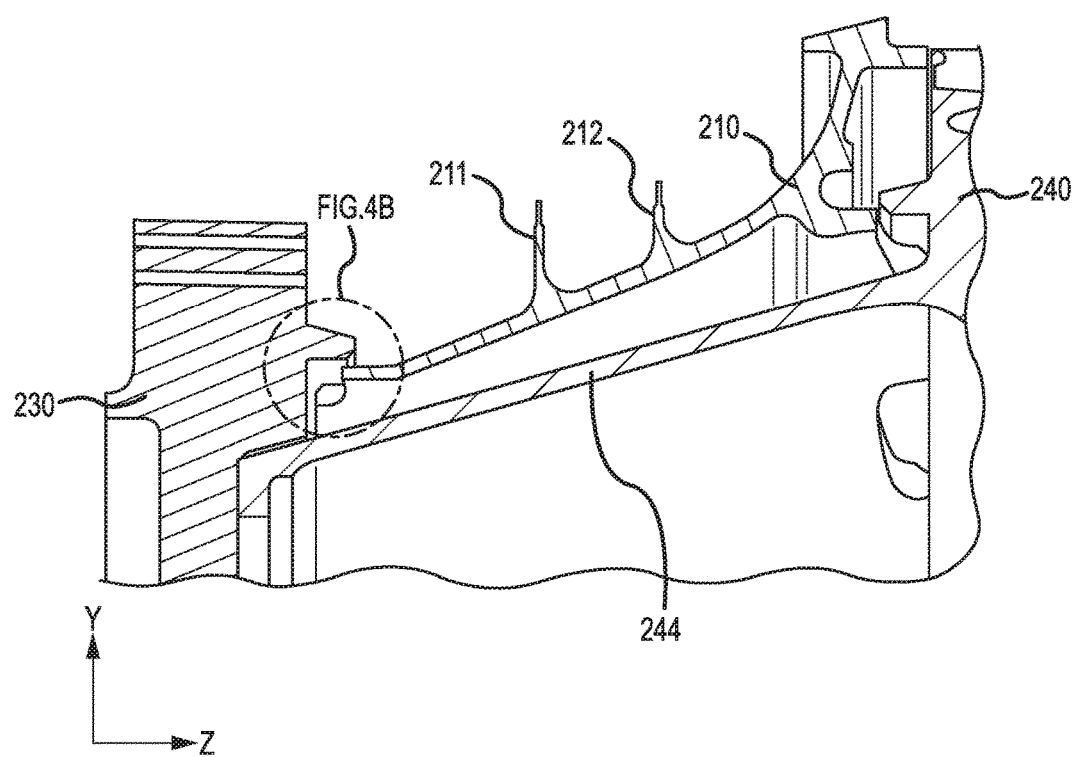
FIG. 4A illustrates a cross-section view of the air seal in an installed position, the cross section intersecting channels disposed in the forward side of the air seal, in accordance with various embodiments.
Figure 4B:
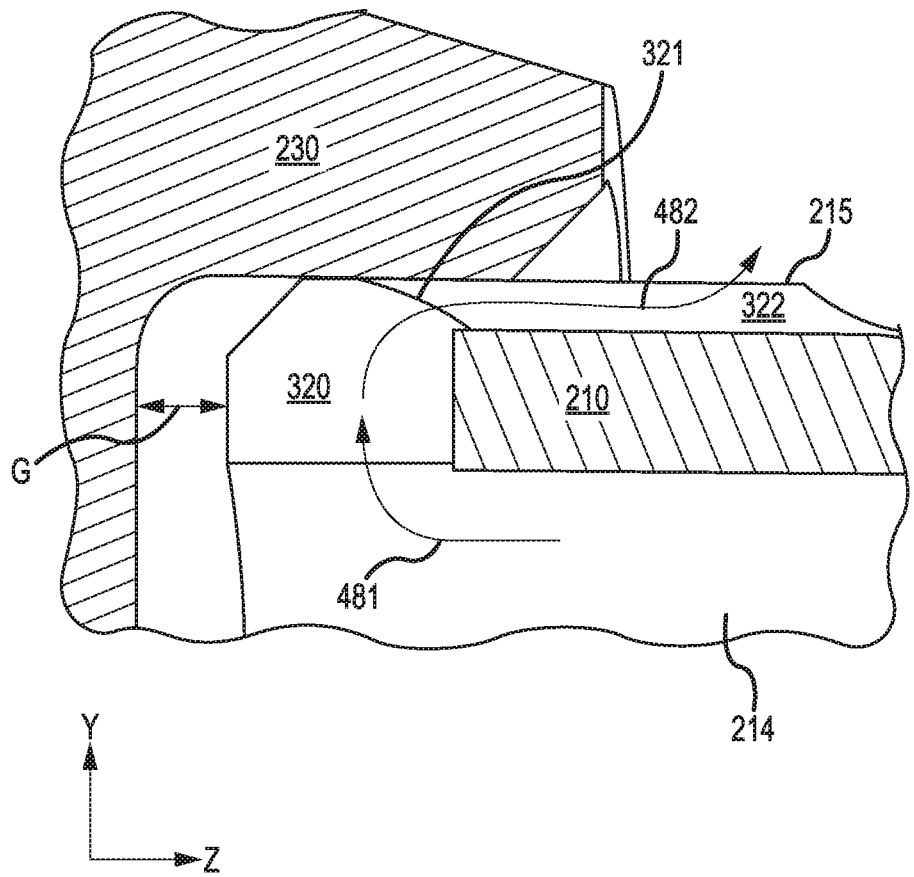
FIG. 4B illustrates a close up view of the forward side of the air seal of FIG. 4A, in accordance with various embodiments.

With combined reference to FIG. 4A and FIG. 4B, a cross-section view, with the cross section intersecting radial channel 320 and axial channel 322, of air seal 210, forward rotor disk 230, and aft rotor disk 240 in an installed position is illustrated, in accordance with various embodiments. As previously mentioned, cooling air may flow into radial channel 320, as illustrated by arrow 481, and into axial channel 322, as illustrated by arrow 482, and exit radially outward from air seal 210. Said cooling air may provide cooling to knife edge 211 and knife edge 212. In this regard, radial channel 320 and axial channel 322 may aid in preventing thermal fatigue of knife edge 211 and knife edge 212. In this regard, a cooling air flow path, as illustrated by arrow 481 and arrow 482 may be defined by radial channel 320, axial channel 322, and forward rotor disk 230.

In various embodiments, the cross-section area of radial channel 320, as measured in the xz-plane, may be greater than the cross-section area of axial channel 322, as measured in the xy-plane. In this regard, axial channel 322 may meter the flow of cooling air through said cooling air flow path. Providing a greater cross-section area of radial channel 320 than the cross-section area of axial channel 322 may prevent radial channel 320 from metering the flow of cooling air through said cooling air flow path in response to air seal moving axially relative to forward rotor disk 230. For example, as illustrated in FIG. 4B, it should be appreciated, that the cross-section area, as measured in the xz-plane, of said cooling air flow path at radial channel 320 may decrease in response to air seal 210 moving in the negative z-direction relative to forward rotor disk 230. In this regard, gap G may decrease in response to air seal 210 moving in the negative z-direction relative to forward rotor disk 230. However, the cross-section area of said cooling air flow path may not change in response to said movement of air seal 210. In this regard, providing a greater cross-section area of radial channel 320 than the cross-section area of axial channel 322 may ensure that axial channel 322 meters the flow of cooling air through said cooling air flow path, independent of gap G.

Figure 5A:
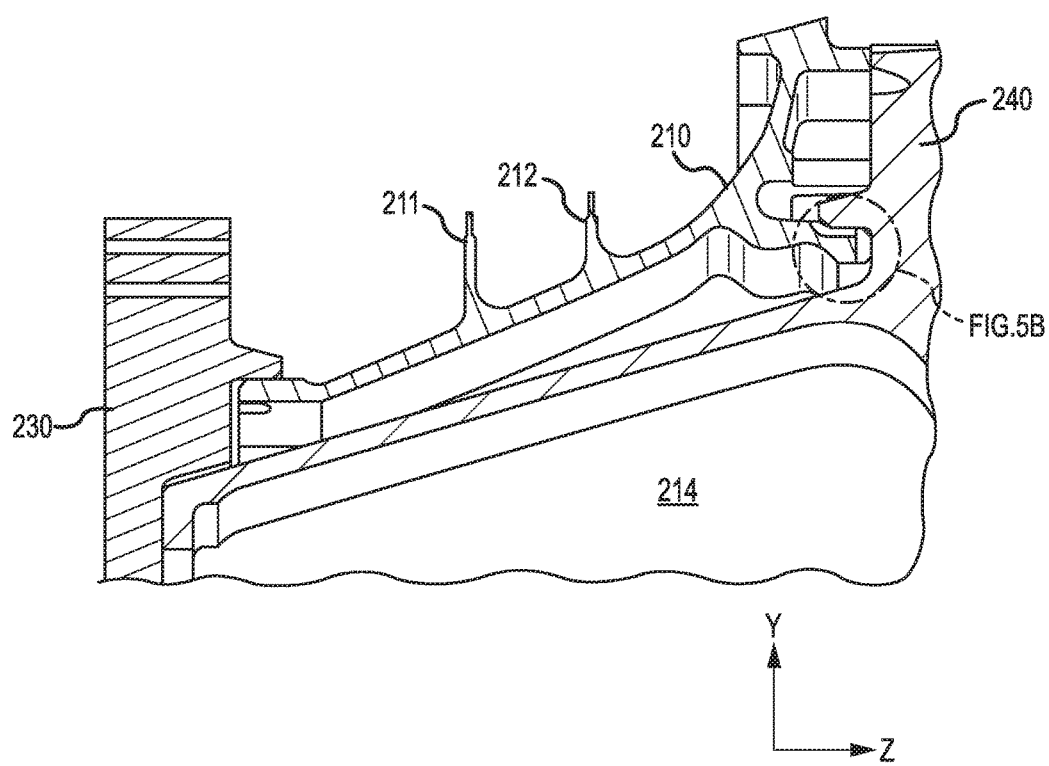
FIG. 5A illustrates a cross-section view of the air seal in an installed position, the cross section intersecting channels disposed in the aft side of the air seal, in accordance with various embodiments.
Figure 5B:
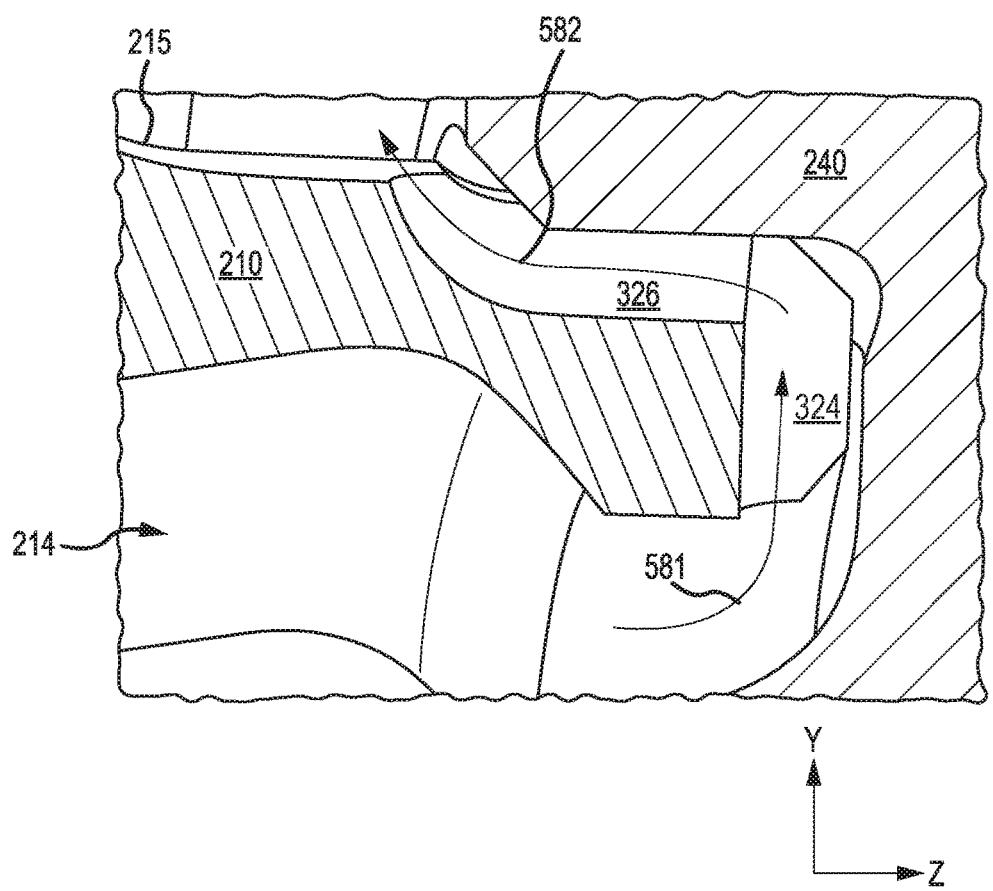
FIG. 5B illustrates a close up view of the aft side of the air seal of FIG. 5A, in accordance with various embodiments.

With combined reference to FIG. 5A and FIG. 5B, a cross-section view, with the cross section intersecting radial channel 324 and axial channel 326, of air seal 210, forward rotor disk 230, and aft rotor disk 240 in an installed position is illustrated, in accordance with various embodiments. As previously mentioned, cooling air may flow into radial channel 324, as illustrated by arrow 581, and into axial channel 326, as illustrated by arrow 582, and exit radially outward from air seal 210. Said cooling air may provide cooling to air seal 210 and/or aft rotor disk 240. In this regard, radial channel 324 and axial channel 326 may aid in preventing thermal fatigue of air seal 210 and/or aft rotor disk 240. In this regard, a cooling air flow path, as illustrated by arrow 581 and arrow 582 may be defined by radial channel 324, axial channel 326, and aft rotor disk 240.

In various embodiments, the cross-section area of radial channel 324, as measured in the xz-plane, may be greater than the cross-section area of axial channel 326, as measured in the xy-plane. Providing a greater cross-section area of radial channel 324 than the cross-section area of axial channel 326 may ensure that axial channel 326 meters the flow of cooling air through said cooling air flow path.

Figure 6:
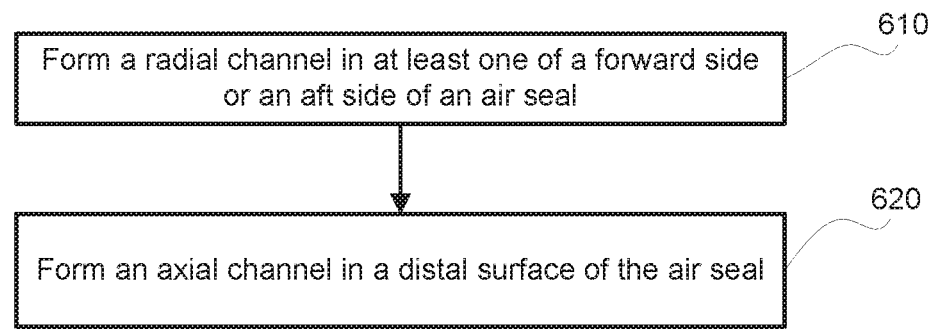
FIG. 6 illustrates a flow chart of a method for manufacturing an air seal for a gas turbine engine, in accordance with various embodiments.

With reference to FIG. 6, a method 600 of manufacturing an air seal for a gas turbine engine is provided, in accordance with various embodiments. Method 600 includes forming a radial channel in at least one of a forward side or an aft side of an air seal (step 610). Method 600 includes forming an axial channel in a distal surface of the air seal (step 620).

With combined reference to FIG. 2 and FIG. 6, step 610 may include forming radial channel 320 in forward side 216 of air seal 210. Step 610 may include forming radial channel 324 in aft side 217 of air seal 210. Step 620 may include forming axial channel 322 in distal surface 215 of air seal 210. Step 620 may include forming axial channel 326 in distal surface 215 of air seal 210.

Radial channel 320, axial channel 322, radial channel 324, and/or axial channel 326 may be formed via a milling process. For example a mill end may be used to cut or grind away material to form the channels. However, radial channel 320, axial channel 322, radial channel 324, and/or axial channel 326 may be formed via any suitable process including additive manufacturing methods and subtractive manufacturing methods.

In various embodiments, air seal 210 may be made of metal or metal alloys. In various embodiments, air seal 210 is made of a nickel superalloy such as an austenitic nickel-chromium-based alloy such as that sold under the trademark Inconel® which is available from Special Metals Corporation of New Hartford, N.Y., USA. Air seal 210 may be made of the same material as forward rotor disk 230 and/or aft rotor disk 240, or may be made of a different material from forward rotor disk 230 and/or aft rotor disk 240.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An air seal for a gas turbine engine comprising:
   an annular ring defined by at least a proximal surface, a distal surface, an aft side and a forward side;
   a radial channel disposed in the air seal, the radial channel disposed in at least one of the forward side or the aft side, the radial channel extending between the proximal surface and the distal surface; and
   an axial channel disposed in the distal surface, the axial channel extending from at least one of the forward side or the aft side and circumferentially in line with the radial channel,
   wherein a cross-section area of the radial channel is greater than a cross-section area of the axial channel.

2. The air seal of claim 1, wherein the radial channel is disposed on the aft side and the axial channel extends from the aft side.

3. The air seal of claim 1, wherein the radial channel is disposed on the forward side and the axial channel extends from the forward side.

4. The air seal of claim 1, wherein the radial channel and the axial channel are configured to direct a cooling air from a proximal side of the air seal to a distal side of the air seal for cooling the air seal.

5. The air seal of claim 4, wherein the air seal is configured to receive the cooling air from an aperture disposed in a rotor disk leg, the rotor disk leg being located radially inward from the air seal.

6. The air seal of claim 1, wherein the air seal is configured to be coupled between a forward rotor disk and an aft rotor disk.

7. The air seal of claim 1, wherein the air seal comprises knife edges extending from the distal surface, the knife edges configured to interface with a proximal surface of a vane platform.

8. The air seal of claim 1, wherein the air seal comprises a nickel-based alloy.

9. A gas turbine engine comprising:
a compressor section;
a combustor section;
a turbine section;
an aft blade disk;
a forward blade disk; and
an air seal coupled between the aft blade disk and the forward blade disk comprising:
an annular ring defined by at least a proximal surface, a distal surface, an aft side and a forward side;
a radial channel disposed in at least one of the forward side or the aft side and extending between the proximal surface and the distal surface; and
an axial channel disposed in the distal surface and extending from at least one of the forward side or the aft side and circumferentially in line with the radial channel,
wherein a cross-section area of the radial channel is greater than a cross-section area of the axial channel.

10. The gas turbine engine of claim 9, wherein the radial channel is disposed on the aft side and the axial channel extends from the aft side.

11. The gas turbine engine of claim 9, wherein the radial channel is disposed on the forward side and the axial channel extends from the forward side.

12. The gas turbine engine of claim 9, wherein the radial channel and the axial channel are configured to direct a cooling air from a proximal side of the air seal to a distal side of the air seal for cooling the air seal.

13. The gas turbine engine of claim 12, wherein the air seal is configured to receive the cooling air from an aperture disposed in a rotor disk leg, the rotor disk leg being located radially inward from the air seal.

14. The gas turbine engine of claim 9, wherein the air seal is configured to be coupled between a forward rotor disk and an aft rotor disk.

15. The gas turbine engine of claim 9, wherein the air seal comprises knife edges extending from the distal surface, the knife edges configured to interface with a proximal surface of a vane platform.

16. The gas turbine engine of claim 9, wherein the air seal comprises a nickel-based alloy.

17. A method of manufacturing an air seal for a gas turbine engine comprising:
forming a radial channel in at least one of a forward side or an aft side of the air seal, the radial channel extending between a proximal surface and a distal surface;
forming an axial channel in a distal surface of the air seal, the axial channel extending from at least one of the forward side or the aft side and circumferentially in line with the radial channel,
wherein the forming the radial channel and the forming the axial channel provides the radial channel having a cross-section area which is greater than a cross-section area of the axial channel.

18. The method of claim 17, wherein the forming the radial channel is performed by milling the at least one of the forward side or the aft side of the air seal.

\* \* \* \* \*